United States Patent
Hwang et al.

(10) Patent No.: US 10,500,783 B2
(45) Date of Patent: Dec. 10, 2019

(54) METHOD OF DUPLICATING TEXTURE AND PATTERN OF NATURAL MATERIAL USING LOW TEMPERATURE EMBOSSING PROCESS

(71) Applicants: Hyundai Motor Company, Seoul (KR); Kia Motors Corporation, Seoul (KR); Korea University Research and Business Foundation, Seoul (KR)

(72) Inventors: Jin Ho Hwang, Seoul (KR); Keon Soo Jin, Ulsan (KR); Dae Ig Jung, Suwon-si (KR); Ju Hyeon Shin, Seoul (KR); Heon Lee, Seoul (KR)

(73) Assignees: Hyundai Motor Company, Seoul (KR); Kia Motors Corporation, Seoul (KR); Korea University Research and Business Foundation, Seoul (KR)

( * ) Notice: Subject to any disclaimer, the term of this patent is extended or adjusted under 35 U.S.C. 154(b) by 235 days.

(21) Appl. No.: 15/363,700

(22) Filed: Nov. 29, 2016

(65) Prior Publication Data

US 2017/0368737 A1    Dec. 28, 2017

(30) Foreign Application Priority Data

Jun. 22, 2016 (KR) .................. 10-2016-0078030

(51) Int. Cl.
*B44F 9/00* (2006.01)
*B44F 9/12* (2006.01)
(Continued)

(52) U.S. Cl.
CPC ............ *B29C 59/005* (2013.01); *B29C 59/02* (2013.01); *B44C 1/24* (2013.01); *B44F 9/00* (2013.01);
(Continued)

(58) Field of Classification Search
CPC ............... B29C 59/005; B29C 59/02; B29C 2035/0827; B29C 2059/53; B44F 9/12; B44F 9/00; B44C 1/24; B29K 2227/06
See application file for complete search history.

(56) References Cited

U.S. PATENT DOCUMENTS

| | | | | |
|---|---|---|---|---|
| 3,933,558 A | * | 1/1976 | Takahata | B29C 59/046 156/209 |
| 2005/0089671 A1 | * | 4/2005 | Kubota | B29C 33/424 428/143 |
| 2011/0318533 A1 | * | 12/2011 | Lee | B29C 33/3857 428/141 |

FOREIGN PATENT DOCUMENTS

JP    2005-524984 A    8/2005
KR    100495977 B1    6/2005
(Continued)

*Primary Examiner* — Alison L Hindenlang
*Assistant Examiner* — Debjani Roy
(74) *Attorney, Agent, or Firm* — Morgan, Lewis & Bockius LLP

(57) ABSTRACT

A method of duplicating texture and pattern of a natural material using a low temperature embossing process is provided. More particularly, in the method of duplicating texture and pattern of a natural material using a low temperature embossing process, a polymer resin having low glass transition temperature is coated on a surface of the natural material and then low temperature embossing process is performed thereon at a specific temperature and a specific pressure to duplicate a distinct texture and a fine pattern of the natural material as they are, thereby improving luxurious and aesthetic properties and achieving a large area and mass production, such that it may be applied to interior and exterior materials of a car, a case of a cellular phone and a laptop, home appliances, or the like.

6 Claims, 15 Drawing Sheets

(51) Int. Cl.
*B29C 35/02* (2006.01)
*B29C 59/00* (2006.01)
*B29C 59/02* (2006.01)
*B44C 1/24* (2006.01)
B29K 227/06 (2006.01)
B29C 35/08 (2006.01)

(52) U.S. Cl.
CPC ............... *B44F 9/12* (2013.01); *B29C 35/02* (2013.01); *B29C 2035/0827* (2013.01); *B29K 2227/06* (2013.01); *B29K 2995/002* (2013.01)

(56) References Cited

FOREIGN PATENT DOCUMENTS

| | | |
|---|---|---|
| KR | 10-0874492 B1 | 12/2008 |
| KR | 20100105514 A | 9/2010 |
| KR | 10-2011-0085451 A | 7/2011 |
| KR | 1020110132937 A | 12/2011 |
| KR | 10-1301693 B1 | 8/2013 |
| KR | 10-2014-0081202 A | 7/2014 |
| KR | 10-2015-0017845 A | 2/2015 |

\* cited by examiner

METHOD OF DUPLICATING TEXTURE AND PATTERN OF NATURAL MATERIAL USING LOW TEMPERATURE EMBOSSING PROCESS

CROSS-REFERENCE TO RELATED APPLICATION

The present application claims priority to Korean Patent Application No. 10-2016-0078030 filed on Jun. 22, 2016, the entire contents of which are incorporated herein by reference.

BACKGROUND OF THE INVENTION

Field of the Invention

The present invention relates to a method of duplicating texture and pattern of a natural material using a low temperature embossing process, and more particularly, to a method of duplicating texture and pattern of a natural material using a low temperature embossing process, in which a polymer resin having low glass transition temperature is coated on a surface of the natural material and then low temperature embossing process is performed thereon at specific temperature and specific pressure conditions to duplicate a distinct texture and a fine pattern of the natural material as they are to thereby improve luxurious and aesthetic properties and achieve a large area and mass production, such that it may be applied to interior and exterior materials of car, a case of a cellular phone and a laptop, home appliances, or the like.

Description of Related Art

As a car becomes popular, most people have held their own cars, and therefore a car itself starts to be regarded as part of personal space. Accordingly, technologies of applying an eco-friendly material or a natural material to cases of various home appliances in addition to interior and exterior materials of a car or artificially applying a pattern of the natural material to impart luxurious and aesthetic properties have drawn much attention.

In particular, BMW, SAAB, Toyota, Mitsubishi, Honda, GM, GMC, or the like that are prestigious foreign car brands tend to luxuriously manufacture parts such as a car seat and a dashboard that an actual user mostly contacts using a natural material as if the inside of car is made like the interior of the house to meet customer needs.

However, the natural material applied to the interior material of a car has a distinct pattern or texture, and therefore may be used as refined interiors, but costs high to manufacture. Further, artificially manufacturing the pattern of the natural material may partially similarly achieve the distinct pattern and feeling of the natural material but has a limitation of completely duplicating features like texture, etc.

There is a need for a technology of implementing a distinct fine pattern and texture of various natural materials used for cases of home appliances, interior and exterior materials of a car, or the like as they are to greatly save manufacturing costs while improving luxurious and aesthetic properties.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

To solve the foregoing problems, the present invention is completed by finding that the polymer resin having the low glass transition temperature is coated on the surface of the natural material and then the temperature embossing process is performed thereon at specific temperature and specific pressure conditions to duplicate the distinct texture and the fine pattern of the natural material as they are to improve luxurious and aesthetic properties and achieve the large area and mass production.

Various aspects of the present invention are directed to providing a method of duplicating texture and pattern of a natural material using a low temperature embossing process capable of duplicating a distinct texture and a fine pattern of the natural material as they are.

In one aspect, the present invention provides a method of duplicating texture and pattern of a natural material using a low temperature embossing process, including: (a) forming a first polymer film by coating a first polymer resin having a glass transition temperature of 80 to 90° C. on a natural material; (b) duplicating the texture and pattern of the natural material on the first polymer film by performing first low temperature embossing process on the natural material formed with the first polymer film; (c) separating the natural material and the first polymer film; and (d) forming a metal mold to which the texture and pattern of the first polymer film is duplicated by electroplating metal on the first polymer film to which the texture and pattern are duplicated.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
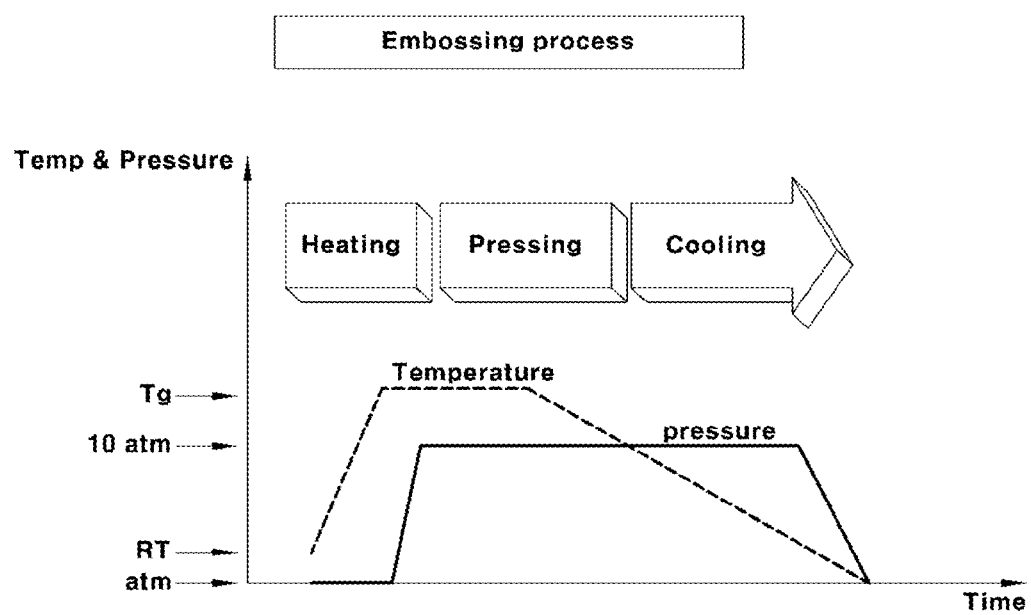
FIG. 1 is a graph showing a temperature and pressure condition cycle of a low temperature embossing process according to an exemplary embodiment of the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, one exemplary embodiment of the present invention will be described in more detail.

A method of duplicating texture and pattern of a natural material using a low temperature embossing process according to an exemplary embodiment of the present invention includes: (a) forming a first polymer film by coating a first polymer resin having a glass transition temperature of 80 to 90° C. on the natural material; (b) duplicating the texture and pattern of the natural material on the first polymer film by performing first low temperature embossing process on the natural material formed with the first polymer film; (c) separating the natural material and the first polymer film; and (d) forming a metal mold to which the texture and pattern of the first polymer film is duplicated by electroplating metal on the first polymer film to which the texture and pattern are duplicated.

According to an exemplary example of the present invention, the natural material may have a one-dimensional shape, a two-dimensional shape, or a three-dimensional shape. In detail, as the natural material, any one selected from the group including textile, leather, tree, plant, insect, and mineral may be used, but the natural material is not limited thereto. Therefore, various types of natural materials may be used.

Figure 3:
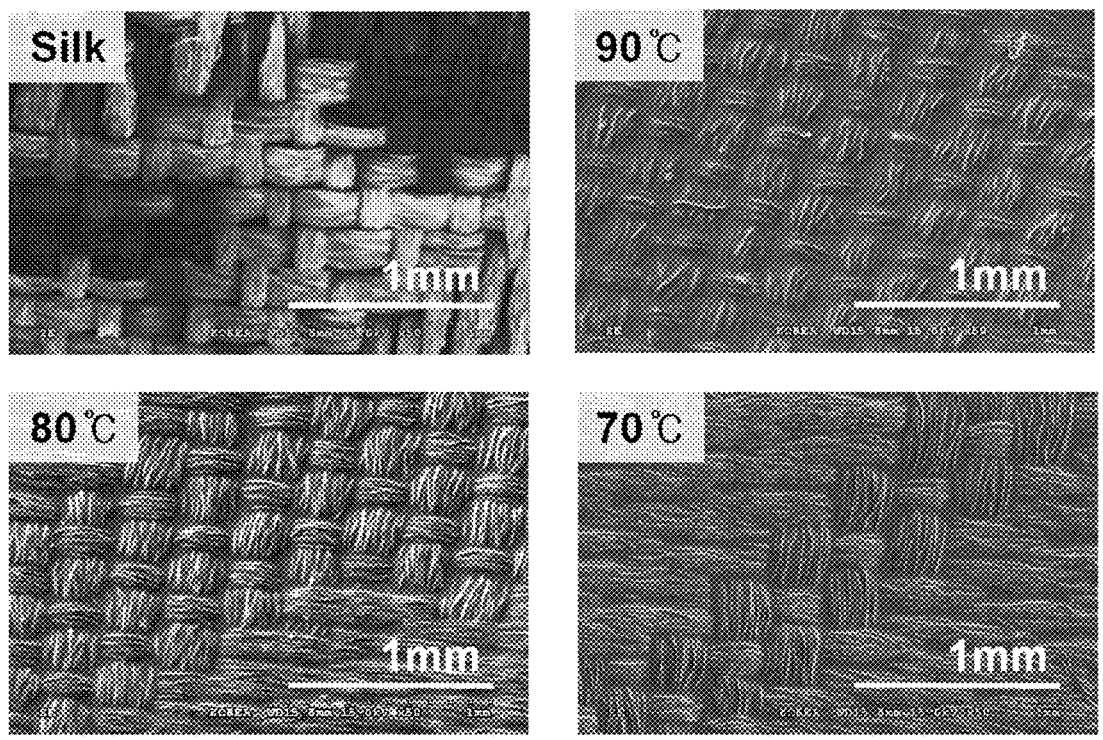
FIG. 3 is SEM images of natural silk and a polyvinyl-chloride film to which texture and pattern of natural silk manufactured by Example 1 of the present invention and Comparative Examples 1 and 2 are duplicated.

According to an exemplary example of the present invention, as the first polymer resin, a liquid polymer resin having a glass transition temperature (Tg) of 80 to 90° C. may be used. When the glass transition temperature is less than 80° C. or exceeds 90° C., as illustrated in FIG. 3, the texture and pattern of the surface of the natural material are damaged, and therefore the duplication may not be made appropriately. Preferably, as the first polymer resin, polyvinylchloride having a glass transition temperature of 87° C. may be used. The polyvinylchloride may duplicate the texture and pattern of the natural material even at a low temperature, and therefore a pattern duplication rate is very excellent at a low temperature of about 80° C. and manufacturing costs may be low.

According to the exemplary example of the present invention, in the step (b), the first low temperature embossing process may be performed at a temperature of 76 to 84° C. and a pressure of 9.5 to 10.5 atm. The first low temperature embossing process may be performed by a scheme of heating the first polymer film with a temperature of 76 to 84° C. by heat or ultraviolet rays and pressing it at a pressure of 9.5 to 10.5 atm. In this case, when the temperature is less than 76° C., it is difficult to duplicate the texture and fine pattern of the natural material as they are and when the temperature is higher than 84° C., the texture and fine pattern of the natural material itself may be damaged by heat. Further, when the pressure is less than 9.5 atm, it is difficult to duplicate the texture and fine pattern and when the pressure exceeds 10.5 atm, the texture and fine pattern may be damaged. Due to the first low temperature embossing process in the step (b), the texture and pattern of the natural material may be elaborately duplicated on the first polymer film up to a nano unit.

FIG. 1 is a graph showing a temperature and pressure condition cycle of a low temperature embossing process according to an exemplary embodiment of the present invention. FIG. 1 shows a temperature and pressure cycle condition of the low temperature embossing process for duplicating the texture and pattern of the natural material as they are without damaging the natural material. In detail, FIG. 1 shows that the temperature is increased to 80±4° C. by an initial heating process of the low temperature embossing process and then the pressure is increased up to a 10±0.5 atm condition by a press process and thus the pattern duplication may be performed under the optimized temperature and pressure condition. Further, a cooling process is performed by slowly reducing the temperature while the pattern duplication is performed and after the cooling process ends, the pressure is reduced and thus the temperature and pressure cycle condition under which the duplication of the texture and pattern is finally completed is shown.

According to the exemplary example of the present invention, in the step (c), the cooling is performed from a temperature of 76 to 84° C. to room temperature and then the natural material and the first polymer resin may be separated from each other.

According to the exemplary example of the present invention, in the step (d), the metal mold may be formed by electroplating metal on the first polymer film to which the texture and pattern are duplicated. The formed metal mold may be reused, and a large area and mass production may be achieved. Further, a stamp may be manufactured by a roll-to-roll scheme using the duplicated first polymer film, thereby achieving mass production. The general roll-to-roll scheme duplicates a pattern of a natural material and then performs a plating process to form a metal thin film and wind it around a roller. According to the exemplary embodiment of the present invention, the texture and pattern of the natural material may be duplicated by coating a polymer on a surface of the roller, stacking the natural material thereon, and performing the low temperature embossing process thereon. Next, a scheme of removing a remaining layer by an etching process and performing a plating process thereon to form the texture and pattern of the natural material of the roller itself may be applied. In this case, as a metal material, nickel metal having a high hardness and density may be used, but the metal material is not limited thereto.

According to the exemplary example of the present invention, the method of duplicating texture and pattern of a natural material using a low temperature embossing process may further include: (e) forming a second polymer film by coating a second polymer resin on the metal mold, after the step (d); (f) performing second low temperature embossing process on a metal mold formed with the second polymer film and then duplicating texture and pattern of the metal mold on the second polymer film; and (g) applying a colorant on the second polymer film to which the texture and pattern are duplicated.

According to the exemplary example of the present invention, as the second polymer resin, any one selected from the group including polyvinyl chloride, polyethylene, polypropylene, polyethylene terephthalate, polymethyl methacrylate, polycarbonate, polystyrene, and polyimide may be used, but the second polymer resin is not limited thereto.

According to the exemplary example of the present invention, in the step (f), the second low temperature embossing process may be performed at the temperature of 76 to 84° C. and the pressure of 9.5 to 10.5 atm like the first low temperature embossing process of the step (b), but the second low temperature embossing process is not limited thereto.

According to the exemplary example of the present invention, in the step (g), a colorant is applied on the second polymer resin to which the texture and pattern are duplicated, thereby achieving feeling of color with excellent aesthetic properties.

Figure 2:
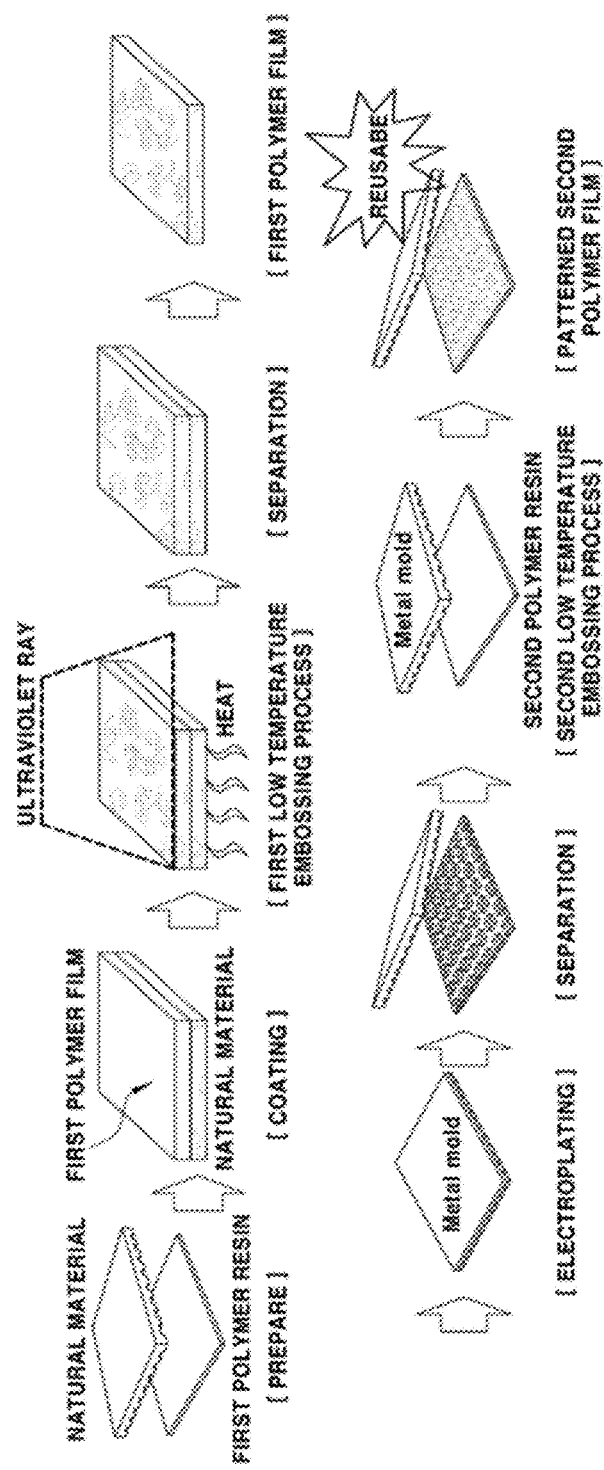
FIG. 2 is a diagram schematically illustrating a method of duplicating texture and pattern of a natural material using a low temperature embossing process according to an exemplary embodiment of the present invention.

FIG. 2 is a diagram schematically illustrating a method of duplicating texture and pattern of a natural material using a low temperature embossing process according to an exemplary embodiment of the present invention.

Therefore, according to the exemplary embodiment of the present invention, the method of duplicating texture and pattern of a natural material using a low temperature embossing process is performed by coating the polymer resin having the low glass transition temperature on the surface of the natural material and then performing the low temperature embossing process thereon at the specific temperature and specific pressure condition to duplicate the distinct texture and the fine pattern of the natural material as they are, thereby enabling the large area and the mass production.

Further, the texture and pattern of the natural material may be duplicated as they are to improve the luxurious and aesthetic properties, and therefore the duplication method may be widely applied to the interior and exterior materials of a car, a case of a cellular phone and a laptop, home appliances, or the like.

Further, by using the duplication method, a user has tactile or visual feeling very similar to the original natural material and the manufacturing costs may be greatly reduced.

Further, the stamp is manufactured by the roll to roll scheme using the duplicated polymer film, thereby achieving the mass production.

Hereinafter, the present invention will be described in more detail based on Examples but is not limited to the following Examples.

Example 1

As the natural material, natural silk was prepared. Next, the polyvinylchloride film was formed by coating a liquid polyvinylchloride resin on the natural silk in a thickness of 1 mm. Next, the texture and pattern of the natural silk were duplicated to the polyvinylchloride film by performing the first low temperature embossing process at a temperature of 80° C. and a pressure of 10 atm. Next, cooling was performed from the temperature of 80° C. to room temperature and then the natural silk and the polyvinylchloride film were separated from each other. The separated resin was electroplated with nickel metal to form the metal mold to which the texture and pattern of the natural silk were duplicated. Next, the polyvinylchloride film was formed by coating the polyvinylchloride resin on the metal mold at a thickness of 1 mm and went through the second low temperature embossing process at the temperature of 80° C. and the pressure of 10 atm, thereby manufacturing the polyvinylchloride film to which the texture and pattern of the natural silk were duplicated.

Example 2

Except that silk cloth was used as the natural material, the same method as the above Example 1 was performed in Example 2, thereby manufacturing the polyvinylchloride film to which the texture and pattern of the silk cloth were duplicated.

Example 3

Except that leather cloth was used as the natural material, the same method as the above Example 1 was performed in Example 3, thereby manufacturing the polyvinylchloride film to which the texture and pattern of the leather cloth were duplicated.

Example 4

To confirm the actual applicability, Example 4 was performed by the same method as the above Example 1 by manufacturing a metal jig having a three-dimensional roof shape, except that the natural material having the three-dimensional shape was used. In detail, the metal jig having 7 cm in breadth and 1.5 cm in height and the three-dimensional roof shape was manufactured, the natural silk was covered thereon, and then the duplication of the texture and pattern to the polyvinylchloride film was performed by the low temperature embossing process of FIG. 1. In this case, as the natural silk, silk having four different patterns was used.

Comparative Example 1

The polyvinylchloride film was duplicated with the texture and pattern of the natural silk by the same method as the above Example 1 and was manufactured like the above Example 1 except that the first low temperature embossing process was performed at a temperature of 70° C.

Comparative Example 2

The polyvinylchloride film was duplicated with the texture and pattern of the natural silk by the same method as the above Example 1 and was manufactured like the above Example 1 except that the first low temperature embossing process was performed at a temperature of 90° C.

Experimental Example 1

To compare and confirm natural silk and the surface of the polyvinylchloride film to which the texture and pattern of the natural silk manufactured by the above Example 1 and the above Comparative Examples 1 and 2 were duplicated, the SEM measurement was performed and the result was shown in FIG. 3.

FIG. 3 shows SEM images of natural silk and the polyvinylchloride film to which the texture and pattern of the natural silk manufactured by the above Example 1 and the above Comparative Examples 1 and 2 were duplicated. As illustrated in FIG. 3, it might be confirmed that the natural silk of the above Example 1 in which the first low temperature embossing process was performed at a temperature of 80° C. has the most excellent pattern duplication rate over the above Comparative Example 1 (70° C.) and the above Comparative Example 2 (90° C.) without damaging the natural silk.

Experimental Example 2

The surface of the polyvinylchloride film to which the texture and pattern of the silk cloth and the leather cloth manufactured by the above Examples 2 and 3 were duplicated was confirmed by the digital images and the SEM measurement and the result was shown in FIGS. 4A to 4D and FIGS. 5A to 5D.

Figure 4A:
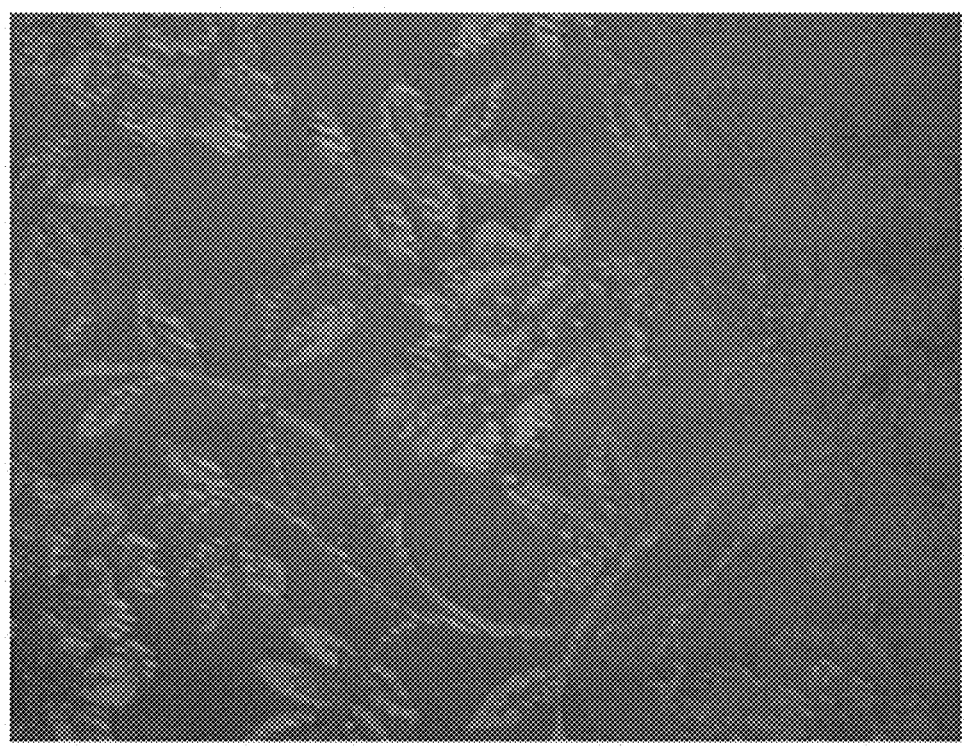
FIG. 4A, FIG. 4B, FIG. 4C, and FIG. 4D are digital images and SEM images of silk cloth and a polyvinylchloride film to which texture and pattern of silk cloth manufactured by Example 2 of the present invention are duplicated.
Figure 4B:
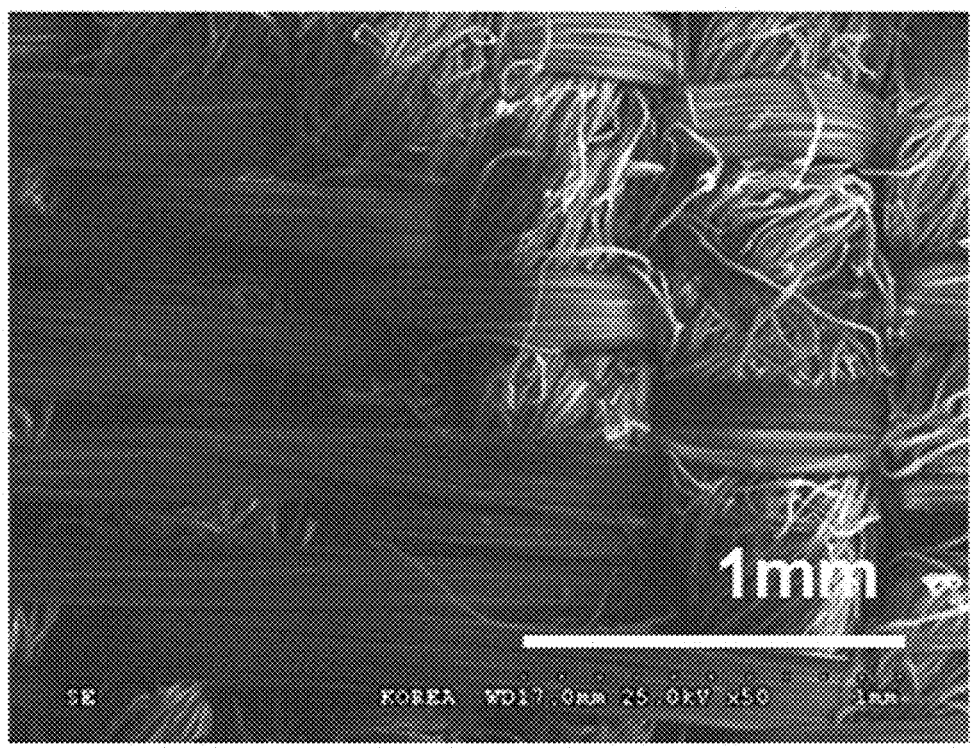
Figure 4C:
Figure 4D:
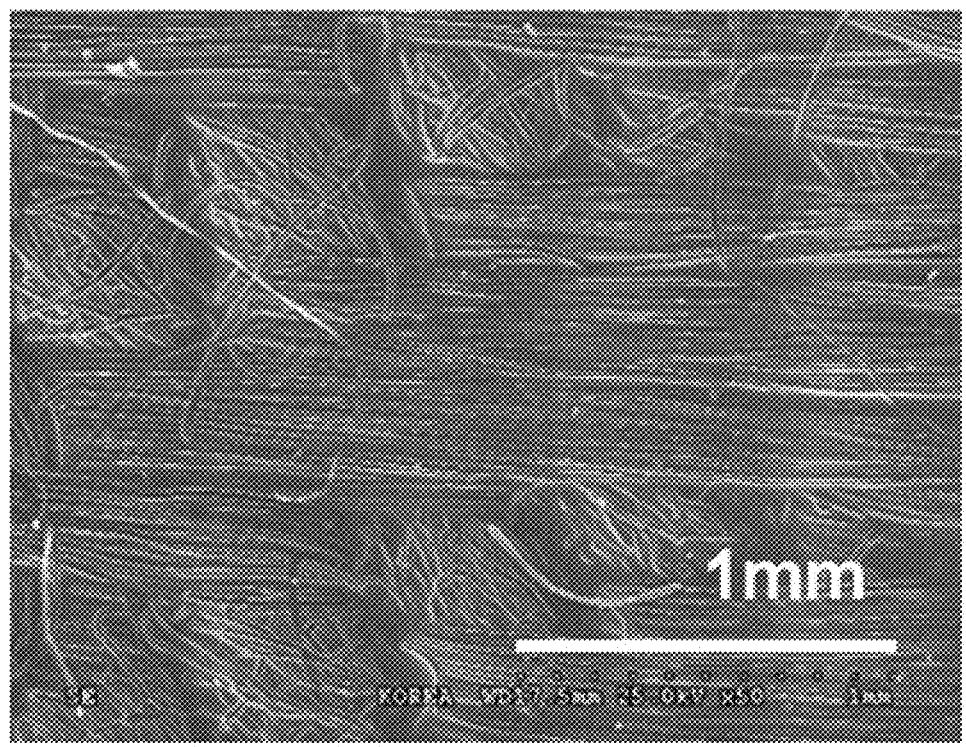

FIGS. 4A to 4D are digital images and SEM images of silk cloth and a polyvinylchloride film to which texture and pattern of silk cloth manufactured by the above Example 2 were duplicated. FIGS. 4A and 4B are digital SEM images of the silk cloth and FIGS. 4C and 4D are digital and SEM images of the duplicated polyvinylchloride film. According to the result of FIGS. 4A to 4D, it might be confirmed that the pattern and the fine pattern of the silk cloth are completely duplicated.

Figure 5A:
FIG. 5A, FIG. 5B, FIG. 5C, and FIG. 5D are digital photographs and SEM photographs of leather cloth and a polyvinylchloride film to which texture and pattern of leather cloth manufactured by Example 3 of the present invention are duplicated.
Figure 5B:
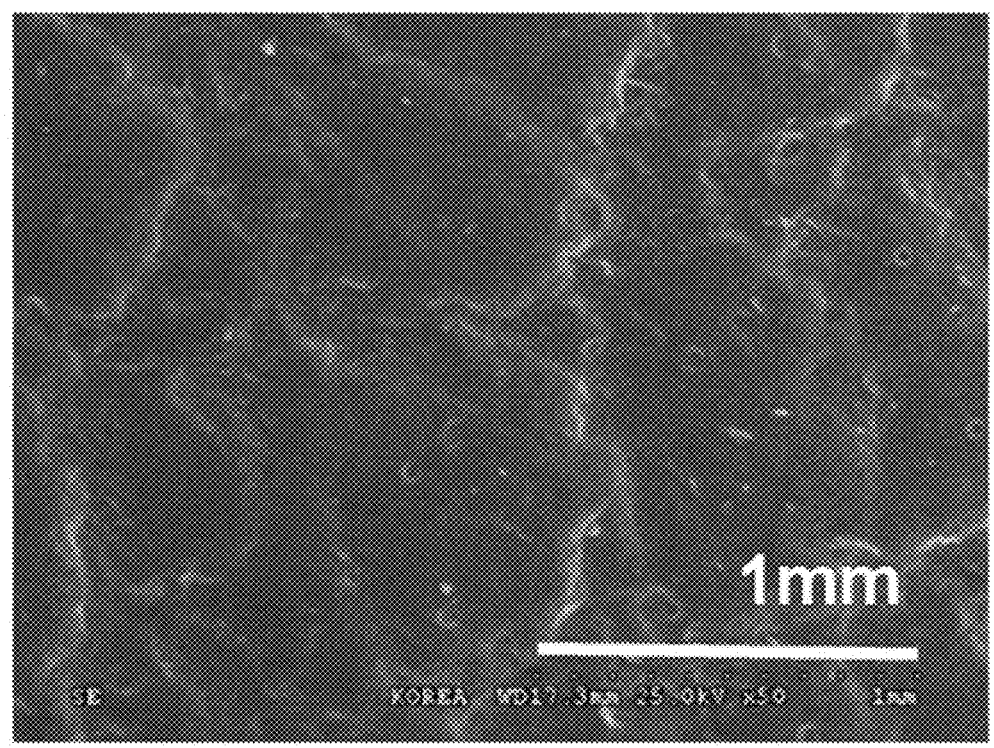
Figure 5C:
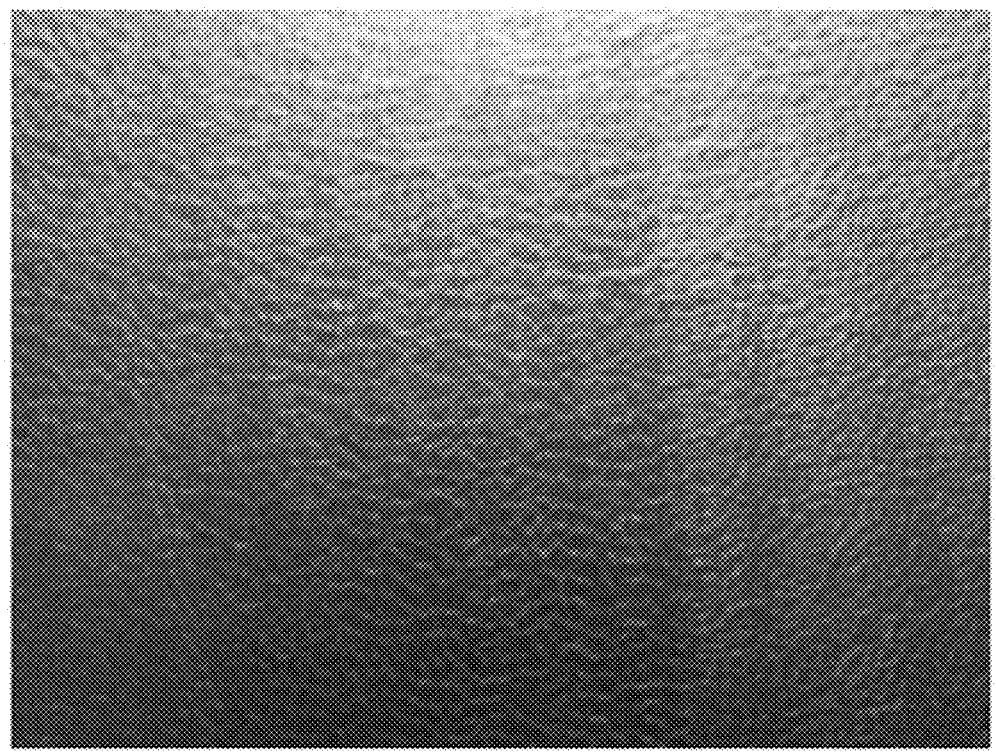
Figure 5D:
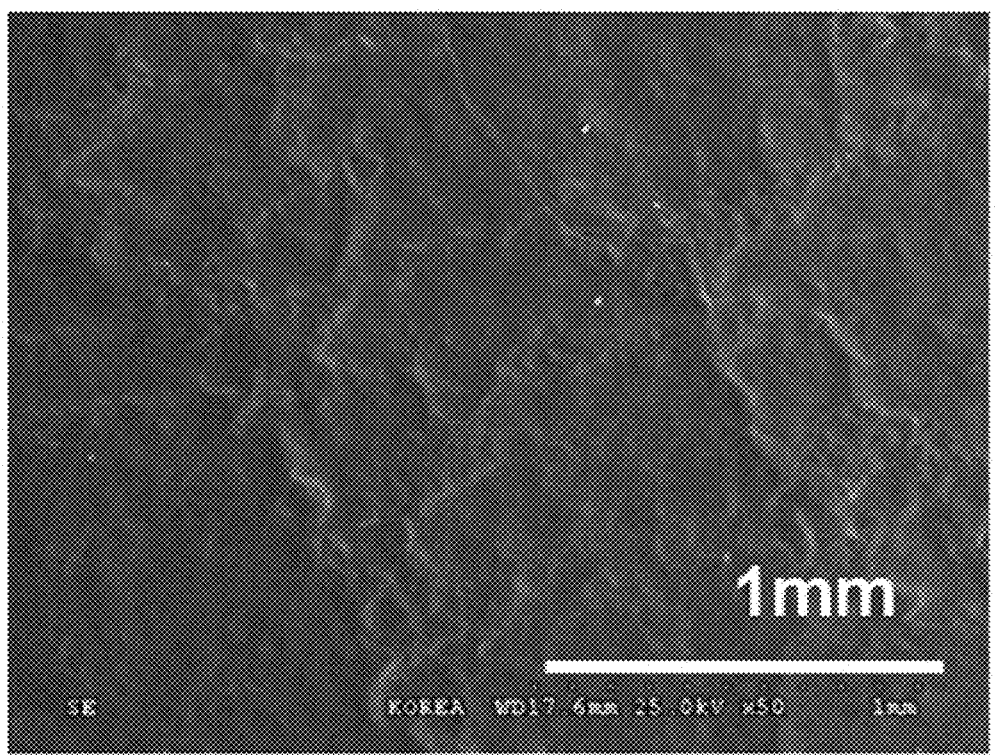
Figure 6A:
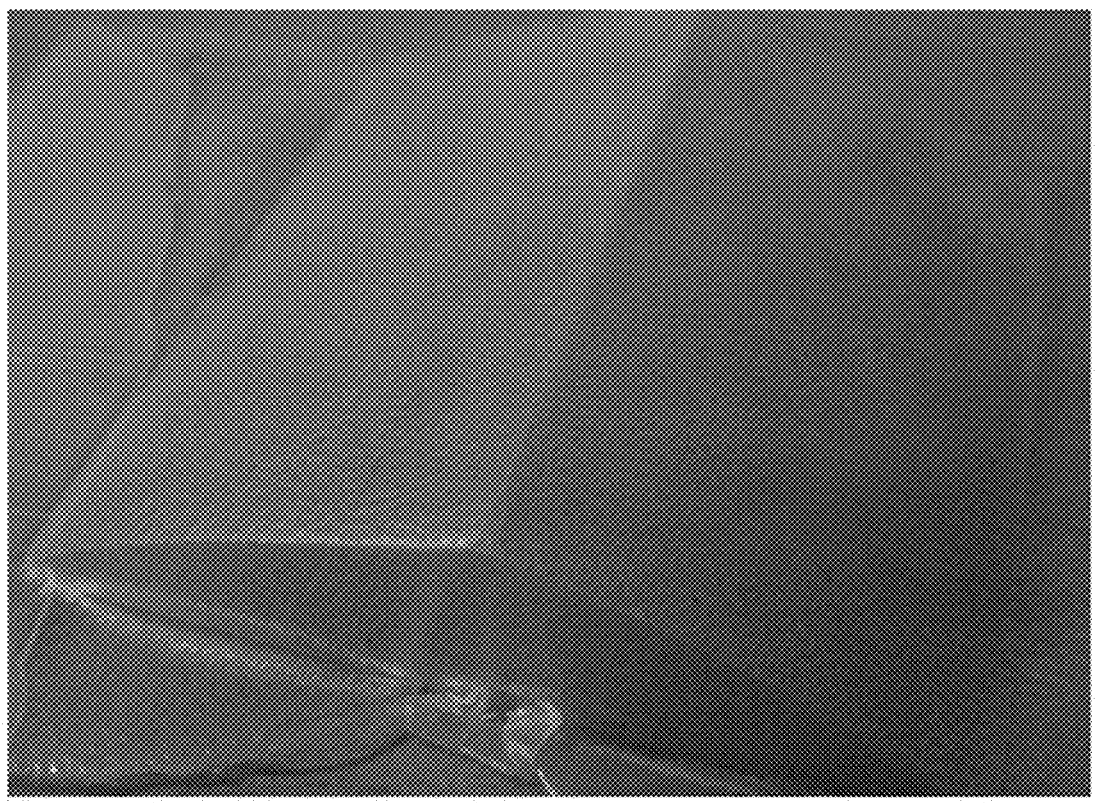
FIG. 6A, FIG. 6B, FIG. 6C, and FIG. 6D are images of a polyvinylchloride film to which texture and pattern of a natural material having a three-dimensional roof shape manufactured by Example 4 of the present invention are duplicated.
Figure 6B:
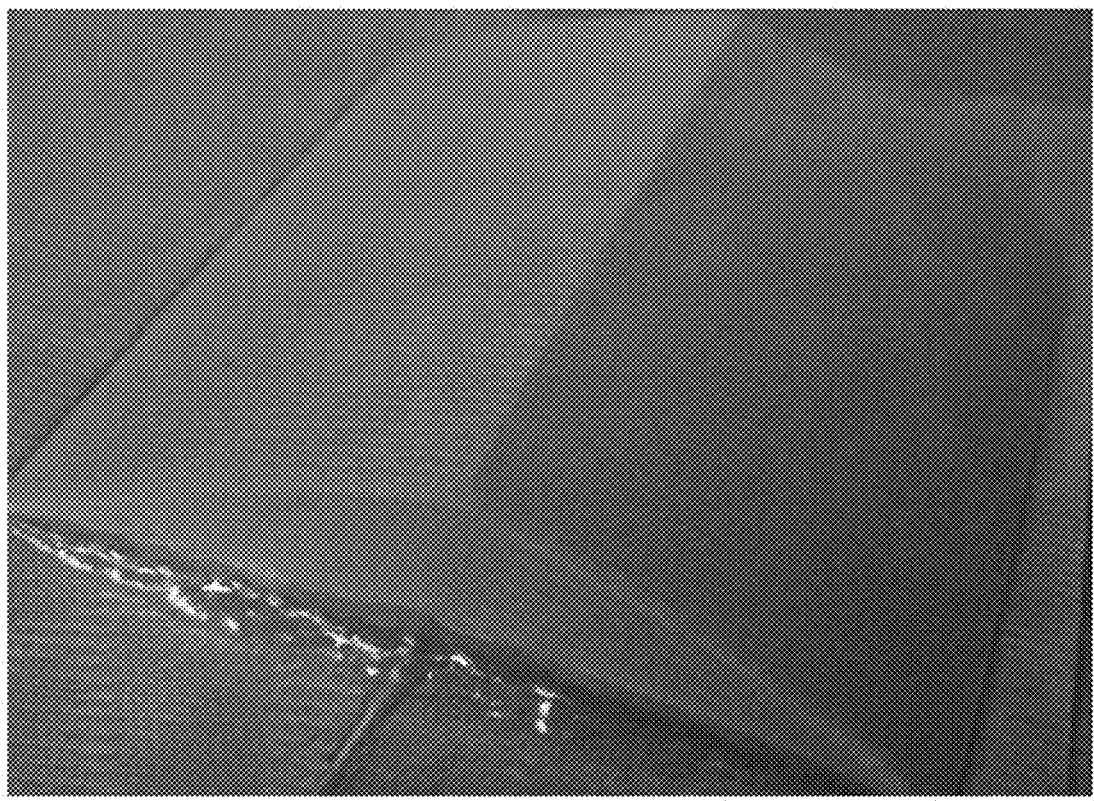
Figure 6C:
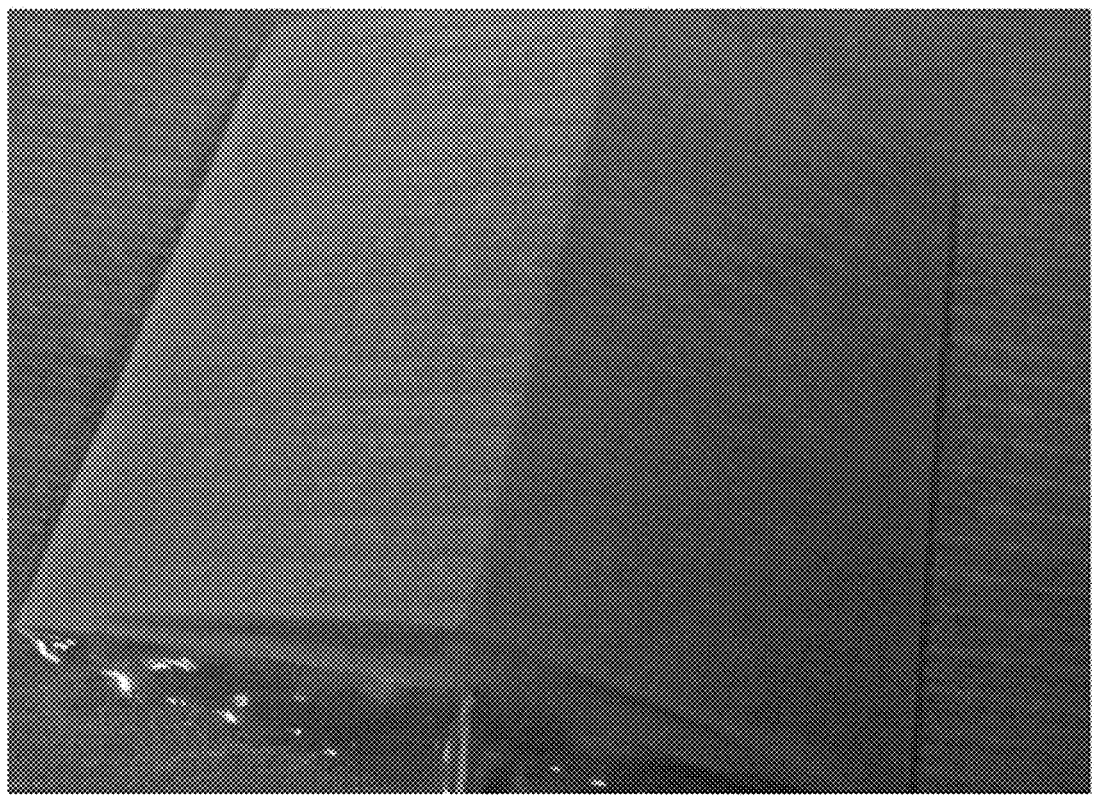
Figure 6D:
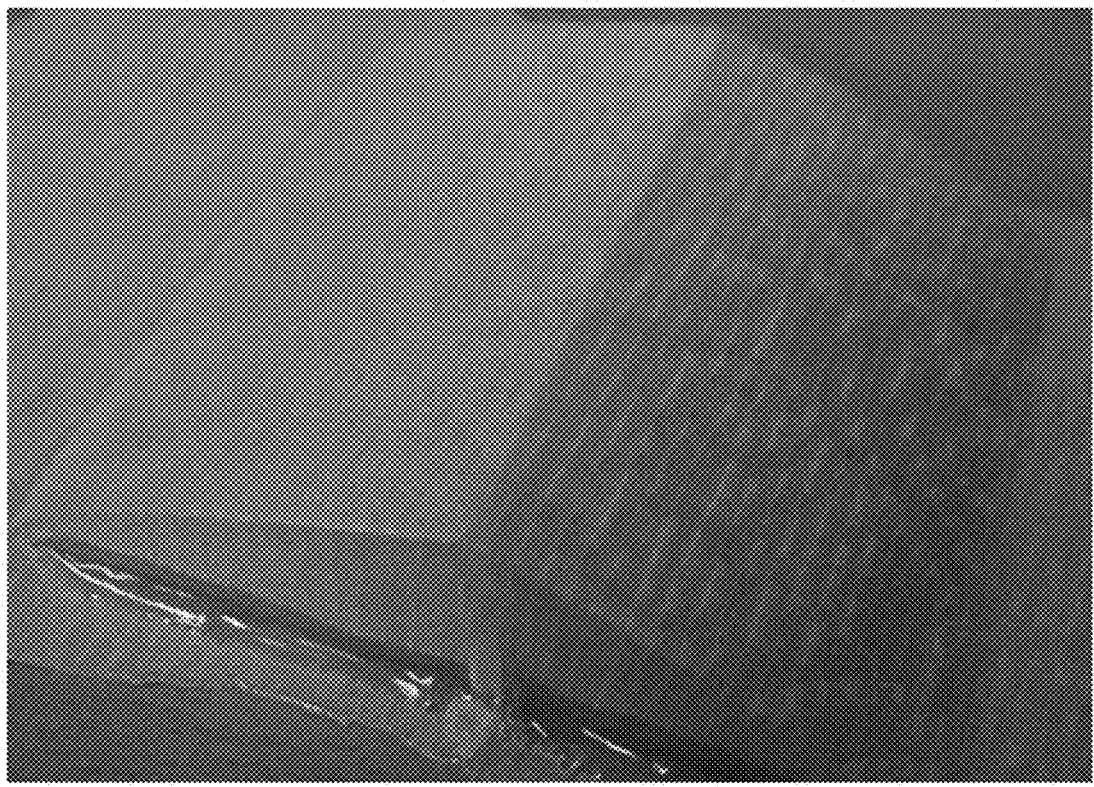

FIGS. 5A to 5D are digital and SEM images of leather cloth and a polyvinylchloride film to which texture and pattern of leather cloth manufactured by the above Example 3 were duplicated. FIGS. 5A and 5B are digital and SEM images of the leather cloth and FIGS. 5C and 5D are digital and SEM images of the duplicated polyvinylchloride film. According to the result of FIGS. 5A to 5D, it might be confirmed that the texture of the leather cloth and the fine pattern of the surface of the leather cloth are completely duplicated.

Experimental Example 3

The polyvinylchloride film to which the pattern of the natural material manufactured to have the three-dimensional roof shape in the above Example 4 was duplicated was confirmed by the digital image and the result is shown in FIG. 6.

FIGS. 6A to 6D are images of a polyvinylchloride film to which texture and pattern of a natural material having a three-dimensional roof shape manufactured by the above Example 4 are duplicated. Referring to FIGS. 6A to 6D, it was confirmed that the pattern and texture of the natural silk that are different at a smooth gradient and a sudden gradient by the roof shape are duplicated as they are. As a result, it might be confirmed that the texture and pattern of various natural materials having the three-dimensional shape can be duplicated.

According to the exemplary embodiment of the present invention, the method of duplicating texture and pattern of a natural material is performed by coating the polymer resin having the low glass transition temperature on the surface of the natural material and then performing the low temperature embossing process thereon at the specific temperature and specific pressure condition to duplicate the distinct texture and the fine pattern of the natural material as they are, thereby achieving the large area and the mass production.

Further, the texture and pattern of the natural material may be duplicated as they are to improve luxurious and aesthetic properties, and therefore the duplication method may be widely applied to the interior and exterior materials of a car, a case of a cellular phone and a laptop, home appliances, or the like.

Further, by using the duplication method, a user has tactile or visual feeling very similar to the original natural material and the manufacturing costs may be greatly reduced.

Further, the stamp is manufactured by the roll to roll scheme using the duplicated polymer film, thereby achieving the mass production.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of duplicating texture and pattern of a natural material using a low temperature embossing process, comprising:
    (a) forming a first polymer film by coating a first polymer resin having a glass transition temperature of 80 to 90° C. on the natural material;
    (b) duplicating the texture and pattern of the natural material on the first polymer film by performing first low temperature embossing process on the natural material formed with the first polymer film;
    (c) separating the natural material and the first polymer film; and
    (d) forming a metal mold to which the texture and pattern of the first polymer film is duplicated by electroplating metal on the first polymer film to which the texture and pattern are duplicated,
        wherein the natural material includes natural silk, silk, or leather, wherein the first polymer resin is polyvinylchloride, and wherein the first low temperature embossing process is performed at a temperature of 76 to 84° C. and a pressure of 9.5 to 10.5 atm.

2. The method of claim 1, wherein the natural material has a one-dimensional shape, a two-dimensional shape, or a three-dimensional shape.

3. The method of claim 1, wherein in the step (c), cooling is performed from a temperature of 76 to 84° C. to room temperature and then the natural material and the first polymer film are separated from each other.

4. The method of claim 1, further comprising:
(e) forming a second polymer film by coating a second polymer resin on the metal mold after the step (d);
(f) performing second low temperature embossing process on a metal mold formed with the second polymer film and then duplicating texture and pattern of the metal mold on the second polymer film; and
(g) applying a colorant on the second polymer film to which the texture and pattern are duplicated.

5. The method of claim 4, wherein the second polymer resin includes any one selected from the group consisting of polyvinyl chloride, polyethylene, polypropylene, polyethylene terephthalate, polymethyl methacrylate, polycarbonate, polystyrene, and polyimide.

6. The method of claim 4, wherein in the step (f), the second low temperature embossing process is performed at a temperature of 76 to 84° C. and a pressure of 9.5 to 10.5 atm.

* * * * *